(12) United States Patent
Jang et al.

(10) Patent No.: US 10,790,720 B2
(45) Date of Patent: Sep. 29, 2020

(54) BLOWER MOTOR

(71) Applicant: NEW MOTECH CO., LTD., Gwangju (KR)

(72) Inventors: Jeong Cheol Jang, Gwangju (KR); Ji Min Lee, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 91 days.

(21) Appl. No.: 16/331,144

(22) PCT Filed: Sep. 18, 2017

(86) PCT No.: PCT/KR2017/010180
§ 371 (c)(1),
(2) Date: Mar. 7, 2019

(87) PCT Pub. No.: WO2018/084427
PCT Pub. Date: May 11, 2018

(65) Prior Publication Data
US 2019/0260262 A1    Aug. 22, 2019

(30) Foreign Application Priority Data

Nov. 3, 2016    (KR) .................. 10-2016-0145496

(51) Int. Cl.
*H02K 5/16*    (2006.01)
*H02K 5/24*    (2006.01)
(Continued)

(52) U.S. Cl.
CPC .............. *H02K 5/24* (2013.01); *F04D 25/06* (2013.01); *F04D 25/0606* (2013.01);
(Continued)

(58) Field of Classification Search
CPC .......... H02K 5/1732; H02K 5/24; H02K 9/06; H02K 5/00; H02K 5/161; H02K 7/083; H02K 7/14; F04D 29/668
(Continued)

(56) References Cited

U.S. PATENT DOCUMENTS 3,256,828 A * 6/1966 Rule .................... F04D 13/083
                                                                    417/363
3,746,894 A * 7/1973 Dochterman ............ H02K 5/24
                                                                    310/51

(Continued)

FOREIGN PATENT DOCUMENTS

JP            07-009060 U      2/1995
JP            2014-033505 A    2/2014
(Continued)

OTHER PUBLICATIONS

International Search Report for PCT/KR2017/010180 dated Dec. 13, 2017 from Korean Intellectual Property Office.

*Primary Examiner* — Thanh Lam
(74) *Attorney, Agent, or Firm* — Revolution IP, PLLC (57) ABSTRACT

A blower motor includes upper and lower bearings 21 and 22 which are respectively installed on a top and a bottom of a rotating shaft 10; a rotor 30 which is installed around the rotating shaft 10; a stator 40 which gives a magnetic field to the rotor 30 to help the rotor 30 rotate; a fan 50 which is inserted into the top of the rotating shaft 10 to rotate; and a lower housing 60 which supports the bottom of the rotating shaft 10.

7 Claims, 13 Drawing Sheets

(51) Int. Cl.
*F04D 25/06* (2006.01)
*F04D 29/66* (2006.01)
*F16F 7/12* (2006.01)
*H02K 7/08* (2006.01)
*H02K 9/06* (2006.01)
*H02K 7/14* (2006.01)
*B60H 1/00* (2006.01)
*F04D 17/16* (2006.01)

(52) U.S. Cl.
CPC ............. *F04D 29/668* (2013.01); *F16F 7/12* (2013.01); *H02K 5/161* (2013.01); *H02K 7/083* (2013.01); *H02K 7/14* (2013.01); *H02K 9/06* (2013.01); *B60H 1/00428* (2013.01); *B60H 1/00521* (2013.01); *F04D 17/16* (2013.01)

(58) Field of Classification Search
USPC .................................. 310/89–90, 51, 62–63
See application file for complete search history.

(56) References Cited

U.S. PATENT DOCUMENTS

| | | | | |
|---|---|---|---|---|
| 4,161,667 | A | * | 7/1979 | Buckman .................. H02K 5/24 248/603 |
| 5,786,647 | A | * | 7/1998 | Vollmer .................... H02K 5/24 310/51 |
| 8,513,839 | B1 | * | 8/2013 | Larson ...................... H02K 7/14 310/58 |
| 9,856,881 | B2 | * | 1/2018 | Park ........................ F04D 29/626 |
| 2013/0323094 | A1 | | 12/2013 | Jang et al. |
| 2016/0344254 | A1 | | 11/2016 | Jang et al. |

FOREIGN PATENT DOCUMENTS

| | | |
|---|---|---|
| KR | 10-2001-0097340 A | 11/2001 |
| KR | 10-2002-0050031 A | 6/2002 |
| KR | 10-2003-0035232 A | 5/2003 |
| KR | 10-2012-0116611 A | 10/2012 |
| KR | 10-2015-0114602 A | 10/2015 |

\* cited by examiner

BLOWER MOTOR

TECHNICAL FIELD

The present invention relates to a blower motor. More specifically, the present invention relates to a blower motor which may reduce noise and vibration, and thus is suitable to be used in air conditioning devices for vehicles, etc.

BACKGROUND ART

In general, blower motors have been used as a device for sucking in outside air in order to operate an air conditioning system which is an air conditioning device of an automobile. These blower motors rotate a blower fan to pass air in the atmosphere or air inside the automobile around an evaporator, thereby changing hot and humid air to cool and dehumidified air and introducing the air to the inside to maintain a pleasant environment.

However, ordinary blower motors which have no additional structure for preventing noise and vibration are integrally formed with motor cases. Therefore, when operating the blower motors, the vibration and noise of the blower motors are delivered to the inside as they are through a duct, which increases the noise of the vehicle. In order to solve this problem, a structure for preventing the noise of the blower motor has been developed in various ways.

Prior arts relating to a structure for preventing the noise of the blower motor are disclosed in Korean Patent Laid-Open Nos. 2001-0097340, 2003-0035232, etc. The conventional vibration absorbing structure for a motor disclosed in Korean Patent Laid-Open No. 2001-0097340 was developed to insert rubber which absorbs the noise and vibration into a side surface of the motor. However, the structure could not block vertical vibration of the motor, which caused a problem that motor vibration was amplified when the motor rotates at high speed.

Additionally, a structure of another blower motor disclosed in Korean Patent Laid-Open No. 2003-0035232 is to insert an O-ring into a top and a bottom of the blower motor. There was a problem that the hardness was increased according to the compression of the O-ring, which weakens the effect of preventing vibration.

Hereinafter, the present inventors suggest a blower motor with a new structure in order to solve the above-mentioned problems.

DISCLOSURE OF INVENTION

Technical Problem

It is an object of the present invention to reduce the vibration and noise generated according to the rotation of a rotor and a blower fan.

It is another object of the present invention to simplify the installation structure of a damper for buffering in order to reduce the vibration and noise and the installation structure of a bearing housing, thereby improving assembly workability.

Solution to Problem

The present invention relates to a blower motor 100 which comprises upper and lower bearings 21 and 22 which are respectively installed on a top and a bottom of a rotating shaft 10; a rotor 30 which is installed around the rotating shaft 10; a stator 40 which gives a magnetic field to the rotor 30 to help the rotor 30 rotate; a fan 50 which is inserted into the top of the rotating shaft 10 to rotate; and a lower housing 60 which supports the bottom of the rotating shaft 10, the blower motor comprising: fixing brackets 41A and 41B which prolongs the bottom of an insulator 41 constituting the stator 40 to the outside; a first damper for buffering 70 which is insertedly installed on the fixing bracket 41A; a fitting projection for positioning 61 which is integrally protruded at a bottom surface of the lower housing 60 in which the fixing bracket 41B is located; a second damper for buffering 80 which is insertedly and fixedly installed in the fitting projection 61; and an integral bearing housing 90 which stores the upper and lower bearings 21 and 22.

Advantageous Effects of Invention

The present invention reduces top, bottom, left and right vibrations generated in the inside when rotating the blower motor by a damper for buffering which is coupled to a fixing bracket of an insulator, thereby minimizing the delivery of vibrations to the inside of the vehicle and reducing the noise generated by the vibrations at the same time.

Additionally, the present invention performs rapidly and stably the coupling of dampers for buffering for reducing the vibration, thereby shortening an assembly process of the motor and improving productivity.

Also, the present invention simplifies the installation structure of a bearing housing, thereby improving assembly workability.

BRIEF DESCRIPTION OF DRAWINGS

FIGS. 6(a) and (b) are cross-sectional views by the first embodiment of the present invention, FIGS. 6(c) and (d) are cross-sectional views by the second embodiment of the present invention, and FIG. 6(e) is a cross-sectional view by the third embodiment of the present invention;

FIGS. 7(a) and (b) are cross-sectional views by the first embodiment of the present invention, and FIG. 7(c) is a cross-sectional view by the fourth embodiment of the present invention;

FIG. 11(a) illustrates a state where the damper for buffering is inserted into a first protruded fitting projection, and FIG. 11(b) illustrates a state where the damper for buffering is inserted into a second protruded fitting projection;

MODE FOR THE INVENTION

Figure 1:
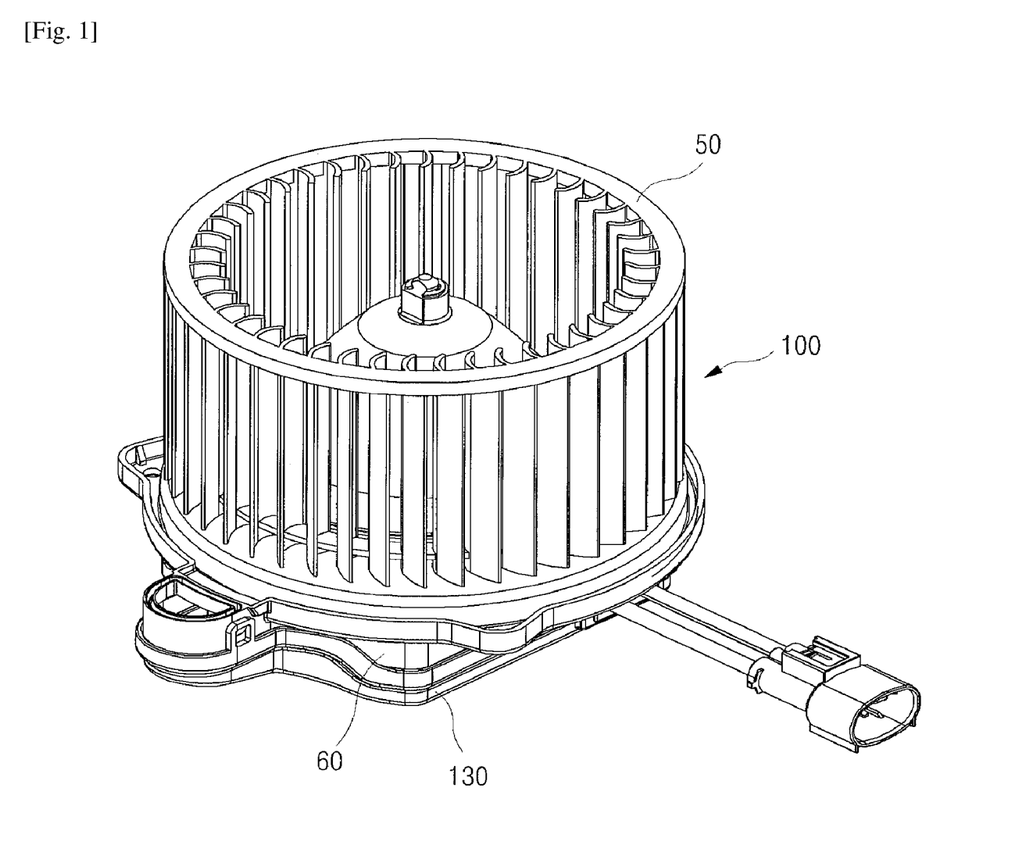
FIG. 1 is a perspective view illustrating an overall constitution of a blower motor according to the present invention.
Figure 2:
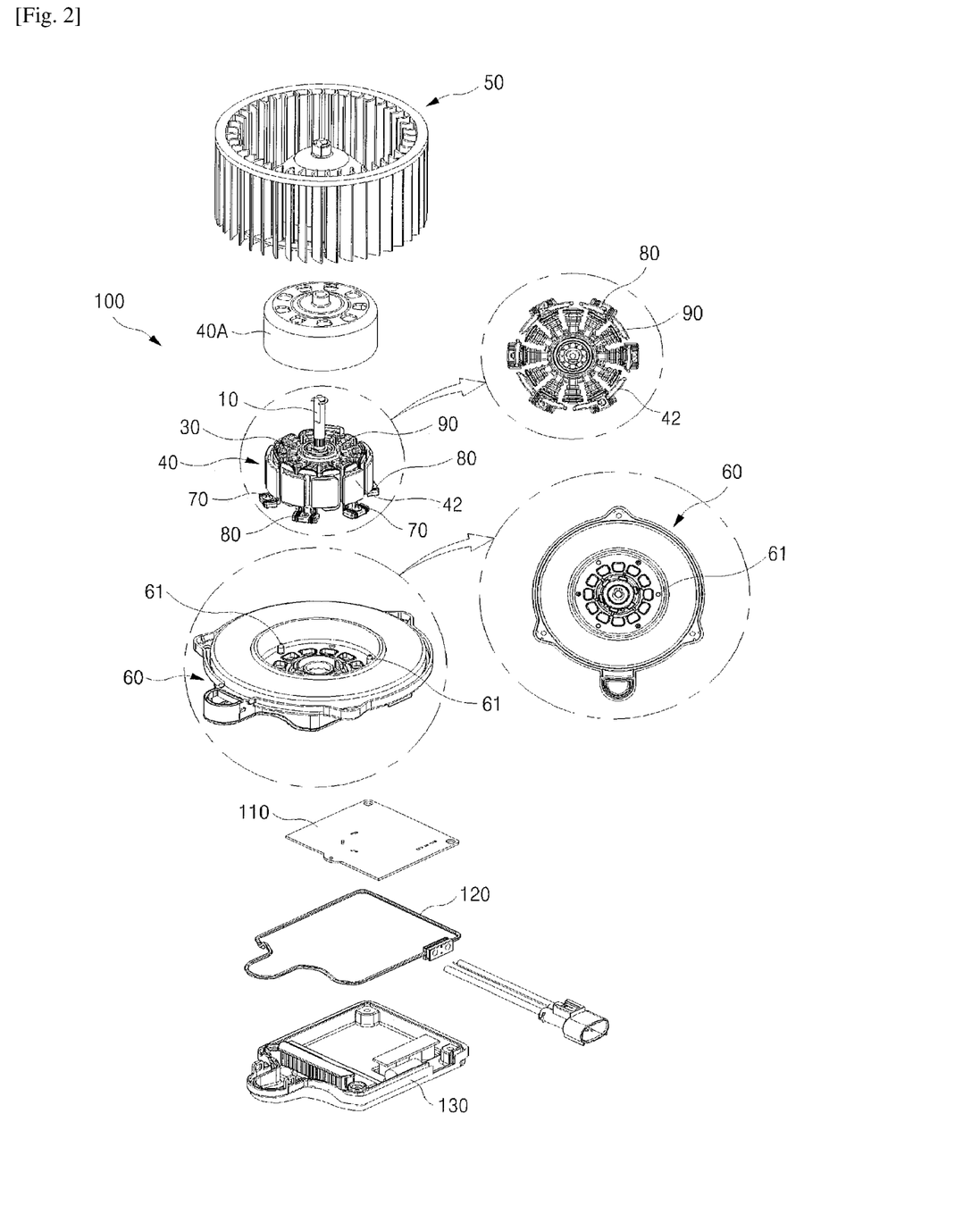
FIG. 2 is an exploded perspective view illustrating the blower motor according to the present invention.
Figure 3:
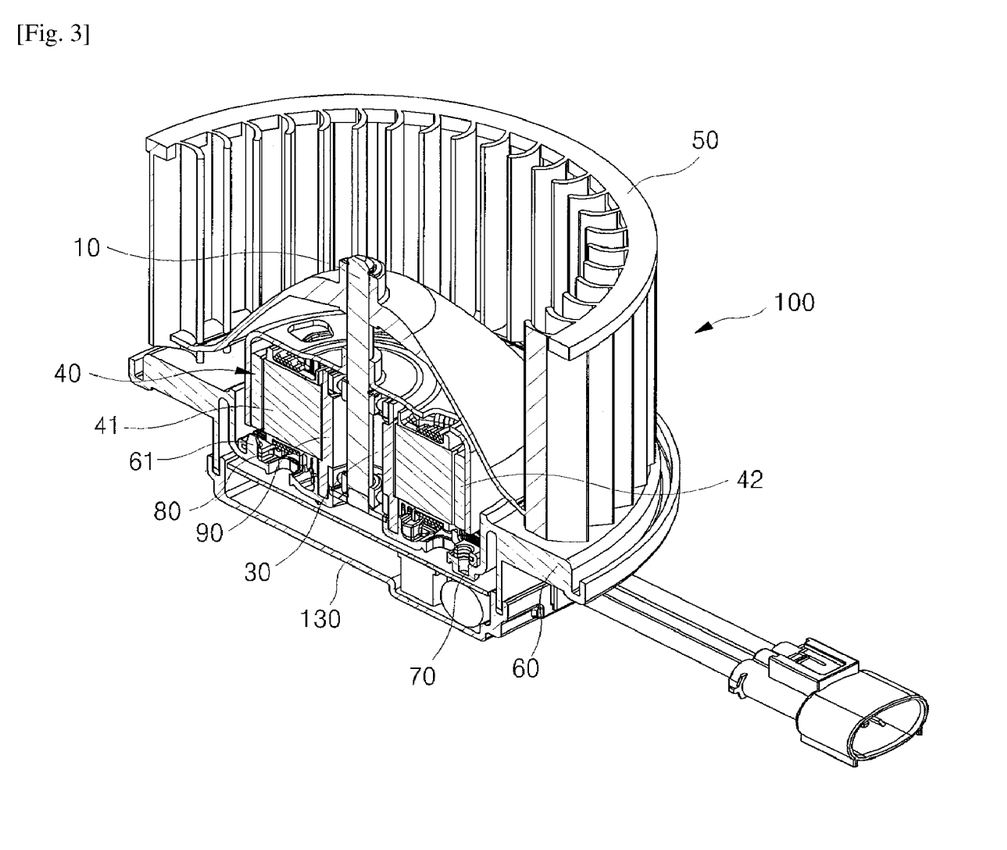
FIG. 3 is a perspective view cutting away a part of the blower motor according to the present invention.
Figure 4:
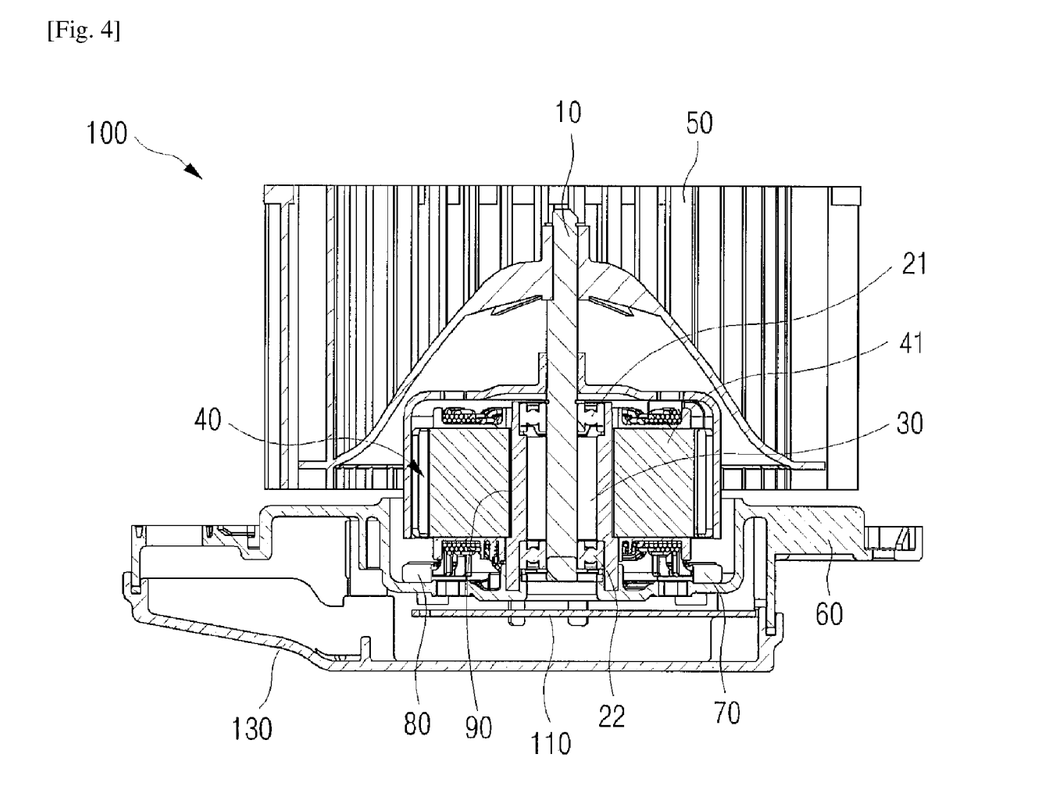
FIG. 4 is a cross-sectional view illustrating the blower motor according to the present invention.
Figure 5:
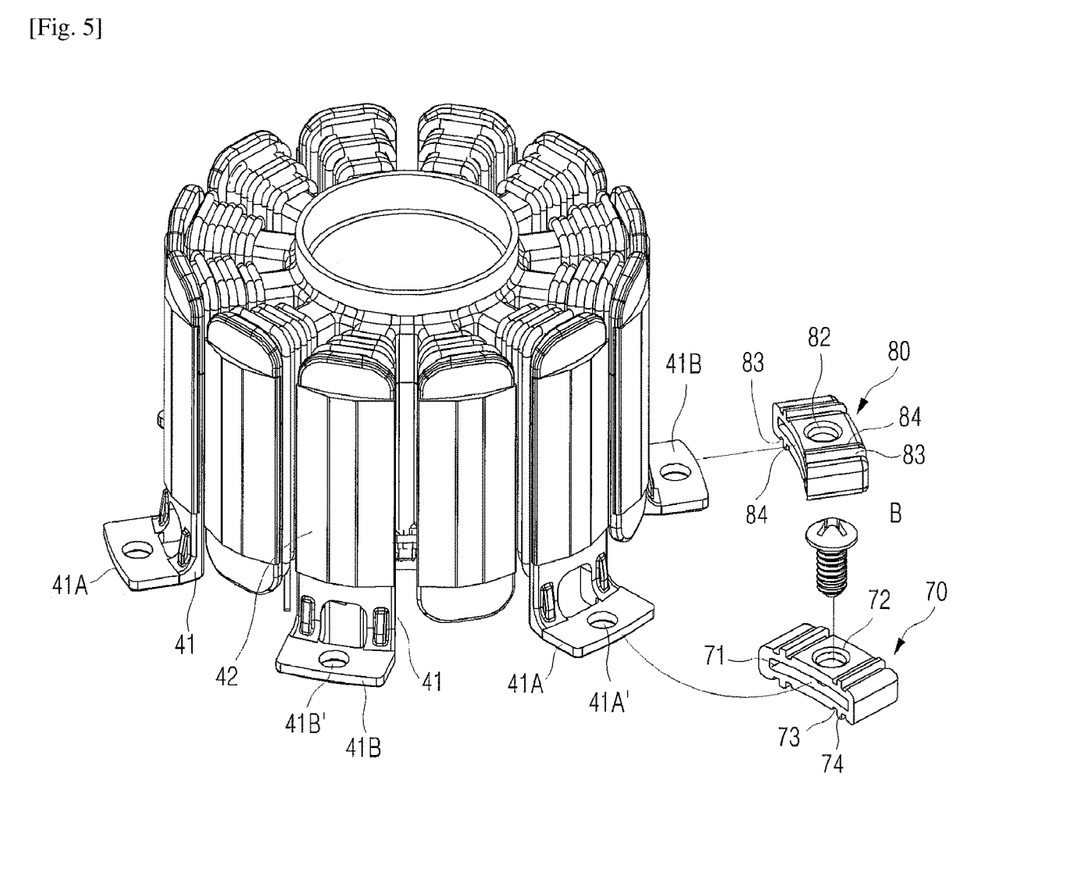
FIG. 5 is a perspective view excerpting a part of the blower motor according to the present invention.

FIG. 1 is a combined perspective view illustrating an overall constitution of the present invention, FIG. 2 is a separated perspective view of the present invention, FIG. 3 is a combined perspective view cutting away a part of the present invention; and FIG. 4 is a combined longitudinal cross-sectional view of the present invention. The present invention will be explained in detail through embodiments with reference to drawings mentioned in the above.

The present invention may comprise upper and lower bearings 21 and 22 which are respectively installed on a top and a bottom of a rotating shaft 10; a rotor 30 which is installed around the rotating shaft 10; a stator 40 which gives a magnetic field to the rotor 30 to help the rotor 30 rotate; a fan 50 which is inserted into the top of the rotating shaft 10 to rotate; and a lower housing 60 which supports the bottom of the rotating shaft 10, the blower motor comprising: fixing brackets 41A and 41B which prolong the bottom of an insulator 41 constituting the stator 40 to the outside; a first damper for buffering 70 which is insertedly installed on the fixing bracket 41A; a fitting projection for positioning 61 which is integrally protruded at a bottom surface of the lower housing 60 in which the fixing bracket 41B is located; a second damper for buffering 80 which is insertedly and fixedly installed in the fitting projection 61; and an integral bearing housing 90 which stores the upper and lower bearings 21 and 22.

In the above, the rotor 30 is inserted into the rotating shaft 10 between the upper bearing 21 and lower bearing 22 of the bearing housing 90 so that the rotating shaft 10 rotates when the rotor 30 rotates, and accordingly, a fan 50 coupled to the top of the rotating shaft 10 rotates. As to the stator 40, a stator core 42 is installed on the outside of the insulator 41, and an inner housing 40A is installed around the stator 40 at the same time. Reference numerals 110, 120 and 130 shown in FIG. 2 illustrate a circuit board, a closed packing and a lower cover, respectively.

The fixing brackets 41A and 41B which prolong the bottom of the insulator 41 to the outside fasten the first damper for buffering 70 and the second damper for buffering 80, respectively. The fixing brackets 41A and 41B are not formed at the bottom of the all of insulators 41 constituting a plurality of teeth, but are formed to the outside of the bottom of the insulators 41 alternately one after another. The fixing bracket 41A for coupling the first damper for buffering 70 and the fixing bracket 41B for coupling the second damper for buffering 80 may be alternately prolonged to the outside of the bottom of the insulator 41.

Especially, a fitting projection 61 which is integrally protruded from a bottom surface of the lower housing 60 in which the fixing bracket 41B is located allows the fixing brackets 41A and 41B to be rapidly assembled at a stable and exact location as will be mentioned later.

The fixing brackets 41A and 41B are formed with fastening holes 41A' and 41B', respectively, one end of each of the first damper for buffering 70 and the second damper for buffering 80 which are made of a rubber material, etc. with excellent elasticity and coupled to the fixing brackets 41A and 41B is formed with opening insertion parts 71 and 81 into which the fixing brackets 41A and 41B are inserted, and another end is formed with closed main bodies 70A and 80A; fastening holes 72 and 82 formed at the center of the main bodies 70A and 80A; and left and right vibration absorbing grooves 73 and 83 and top and bottom vibration absorbing projections 74 and 84 respectively formed at both ends of the top and bottom of the main bodies 70A and 80A, wherein the left and right vibration absorbing grooves 73 and 83 may be used as front and rear vibration absorbing grooves.

Figure 6:
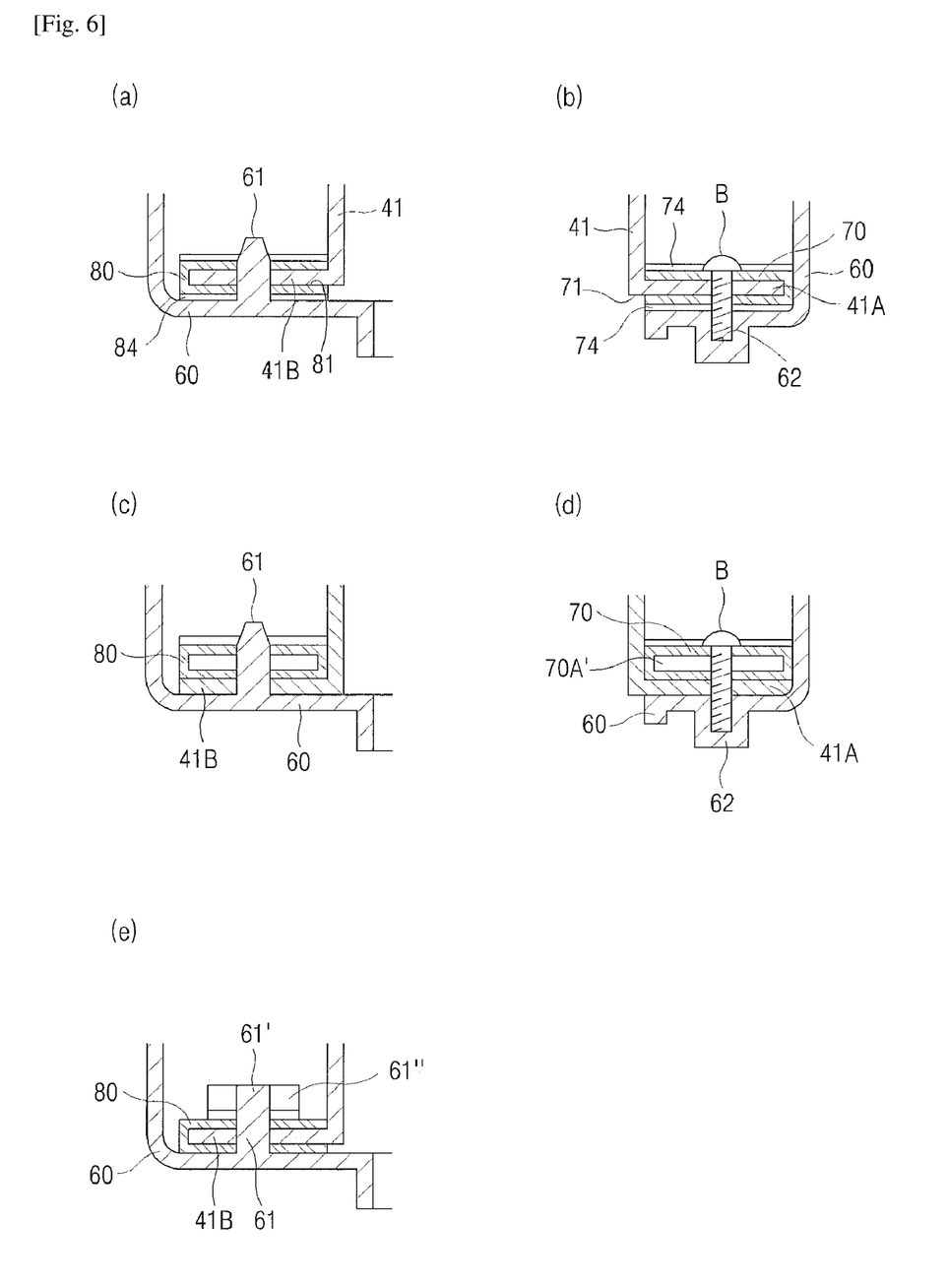
FIG. 6 are perspective views excerpting the blower motor according to the present invention.

In an embodiment of such constitution, as illustrated in FIGS. 6(a) and (b) and 7(a) and (b), the fixing bracket 41B of the insulator 41 constituting the stator 40 is inserted into the opening insertion part 81 of the second damper for buffering 80, and fastening holes 41B' and 82 of each of the fixing bracket 41B and the second damper for buffering 80 are inserted into a fitting projection for positioning 61 while the fixing bracket 41A of the insulator 41 is inserted into the inside of the opening insertion part 71 of the first damper for buffering 70, and thereby the fastening holes 41A' and 72 of each of the fixing bracket 41A and the first damper for buffering 70 are located to correspond to each other in a fastening groove 62 formed at a bottom surface of the lower housing 60, and when a fastening bolt B is inserted into the fastening holes 41A' and 72 and is fastened, the fixing bracket 41A and the first damper for buffering 70 are fixedly installed.

Therefore, when the fitting projection for positioning 61 is coupled to correspond to the respective fastening holes 41B' and 82 of each of the fixing bracket 41B and the second damper for buffering 80, the respective fastening holes 41A' and 72 of each of the fixing bracket 41A and the first damper for buffering 70 are naturally located to correspond to each other in the fastening groove 62 formed at the bottom surface of the lower housing 60, and thus an exact and rapid assembly could be made.

In such state, although the vibration and noise generated by the rotation of the rotor 30 are delivered to the stator 40, the vibration and noise are reduced by the elasticity of the first damper for buffering 70 and the second damper for buffering 80 which are respectively inserted into the fixing bracket 41A and fixing bracket 41B, and thereby the delivery of the vibration and noise to the lower housing 60 is greatly reduced.

In other words, the fixing bracket 41A and fixing bracket 41B are respectively inserted into the inside of the opening insertion parts 71 and 81 of the respective first damper for buffering 70 and the second damper for buffering 80, and thus the top and bottom surfaces of the fixing bracket 41A and fixing bracket 41B are maintained to contact the top and bottom inner side surfaces of the first damper for buffering 70 and the second damper for buffering 80, respectively. Thus, the vibration generated may be buffered and absorbed by the elasticity of the damper, thereby greatly reducing the vibration and greatly decreasing the noise by the vibration.

Especially, the vibration generated is amplified by the movement to top, bottom, left and right. The top and bottom vibrations absorb an impact vibration by using the elasticity of the lower vibration absorbing projections 74 and 84 formed at each of both ends of the bottom of the main bodies 70A and 80A of the first damper for buffering 70 and the second damper for buffering 80, respectively, and the left and right vibrations absorb the impact vibration by the elasticity, which becomes dented to the left and right, of the left and right vibration absorbing grooves 73 and 83 formed at each of both ends of the top and bottom of the main bodies 70A and 80A, thereby greatly reducing the vibration and the noise by the vibration.

Meanwhile, FIGS. 6(c) and (d) illustrate the second embodiment of the present invention. Hollow parts 70A' and 80A' which have air filled inside the first damper for buffering 70 and the second damper for buffering 80 are formed and provided, and in this case, the hollow parts are coupled with the fitting projection 61 and the fastening bolt B in the state where the fixing bracket 41A and the fixing bracket 41B are located at the bottom of the first damper for buffering 70 and the second damper for buffering 80. Thus, the vibration generated when driving the motor may be more buffered by the air inside the hollow parts 70A' and 80A', thereby greatly absorbing the vibration.

Additionally, FIG. 6(e) illustrates the third embodiment of the present invention. A screw part 61' is formed at the top of the fitting projection 61, and a nut 61" is fastened into the screw part 61', thereby allowing the fixing bracket 41B to be coupled more solidly.

Figure 7:
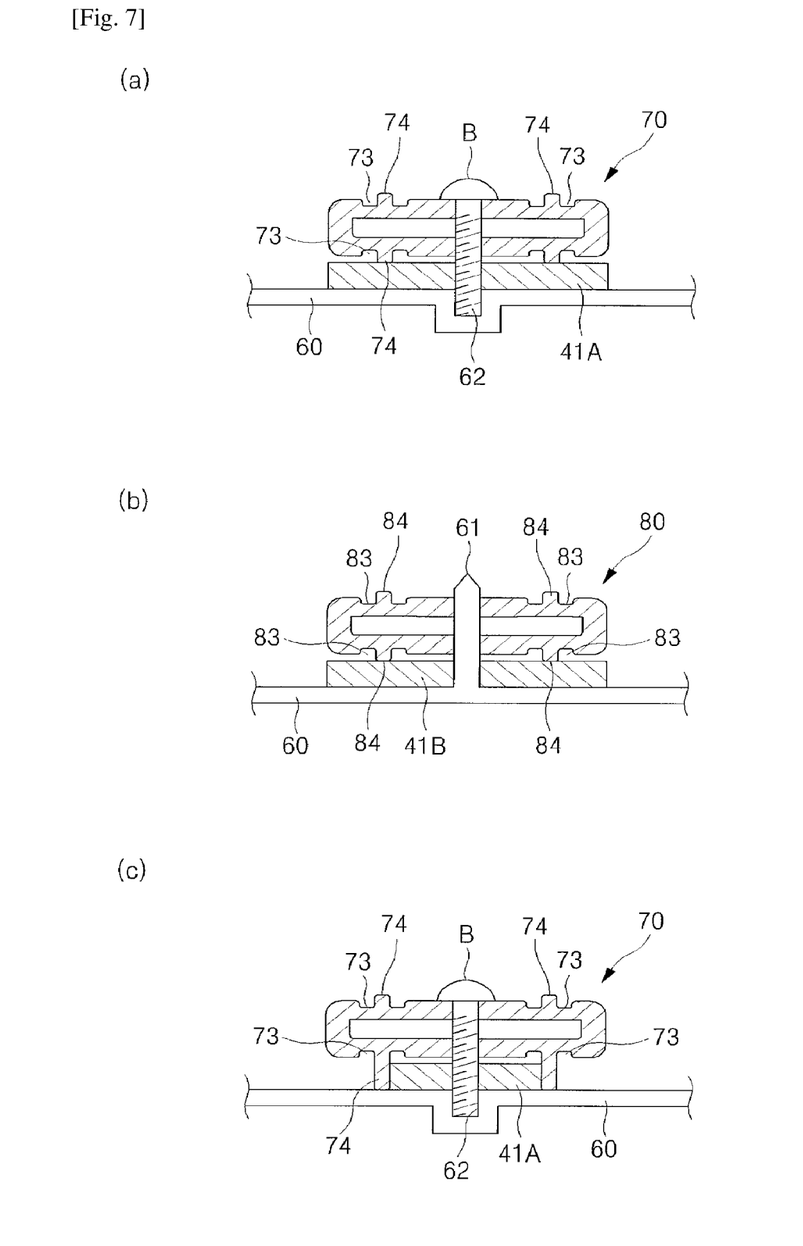
FIG. 7 are cross-sectional views excerpting a part of the blower motor according to the present invention.
Figure 8:
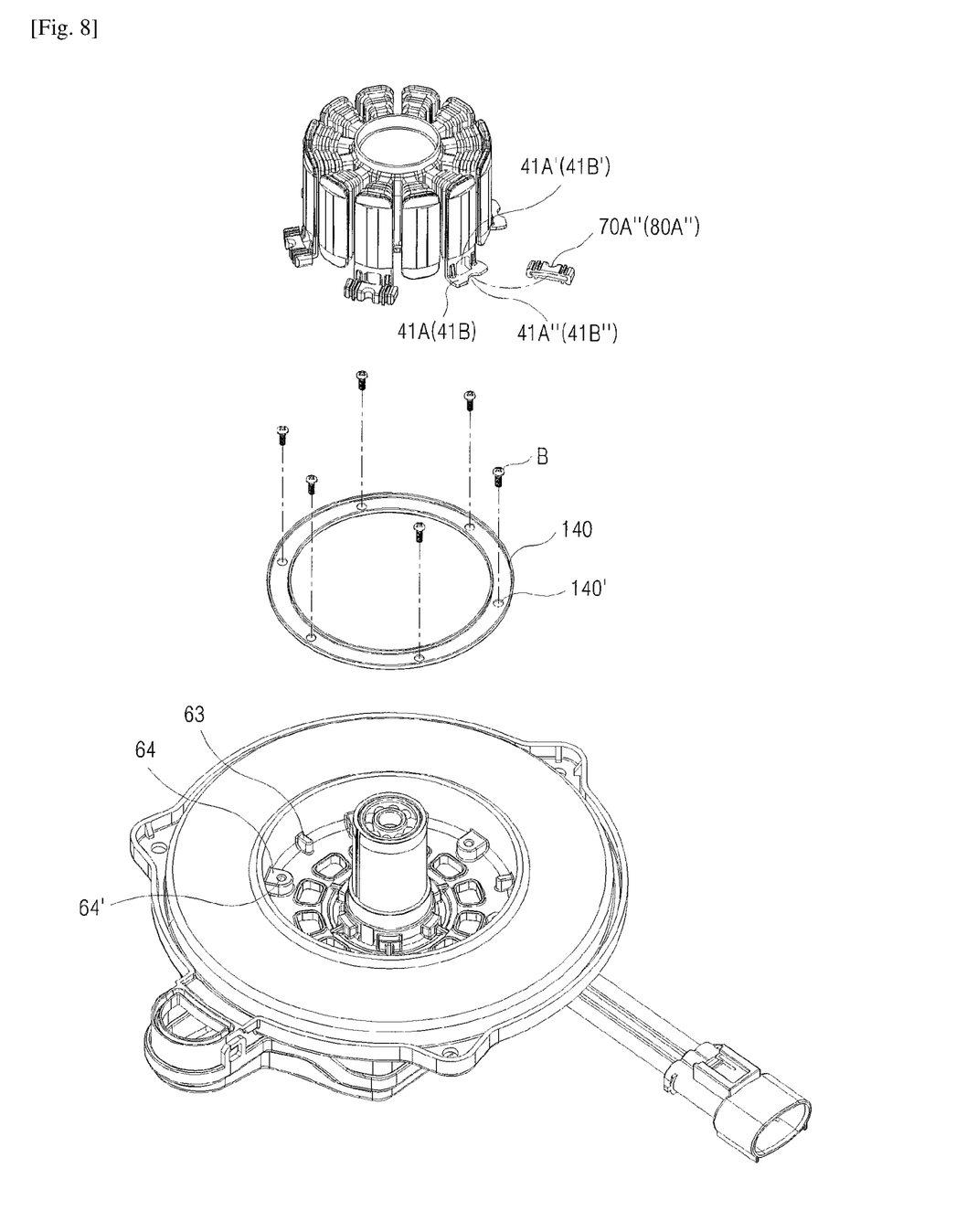
FIG. 8 is a separated perspective view by the fifth embodiment of the present invention.
Figure 9:
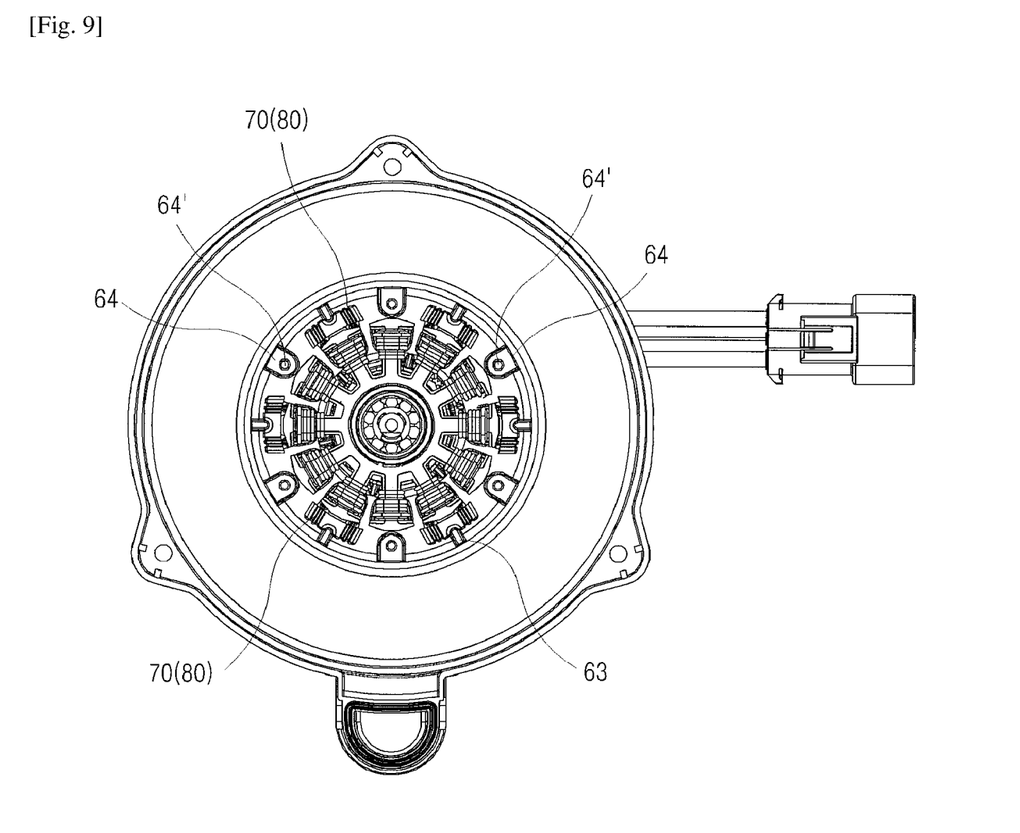
FIG. 9 is a plan view of FIG. 8, which is a plan view illustrating a state without a buffering ring.
Figure 10:
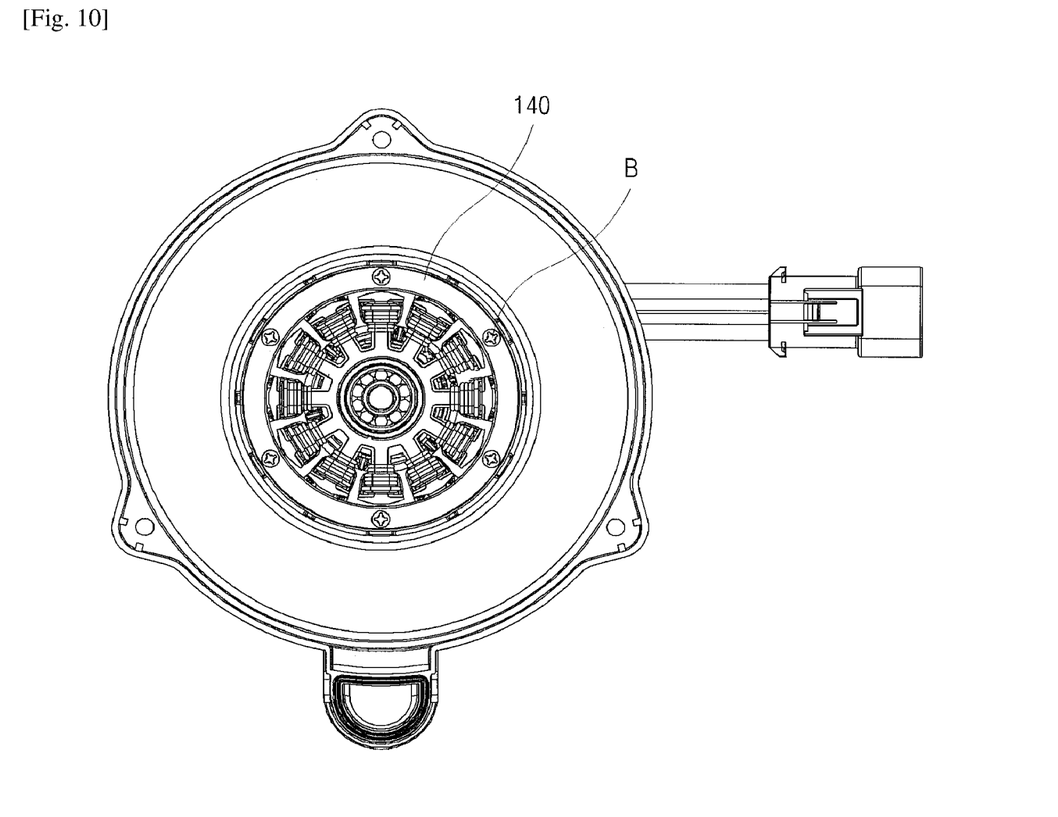
FIG. 10 is the plan view of FIG. 8, which is the plan view illustrating a state where the ring for buffering is installed.
Figure 11:
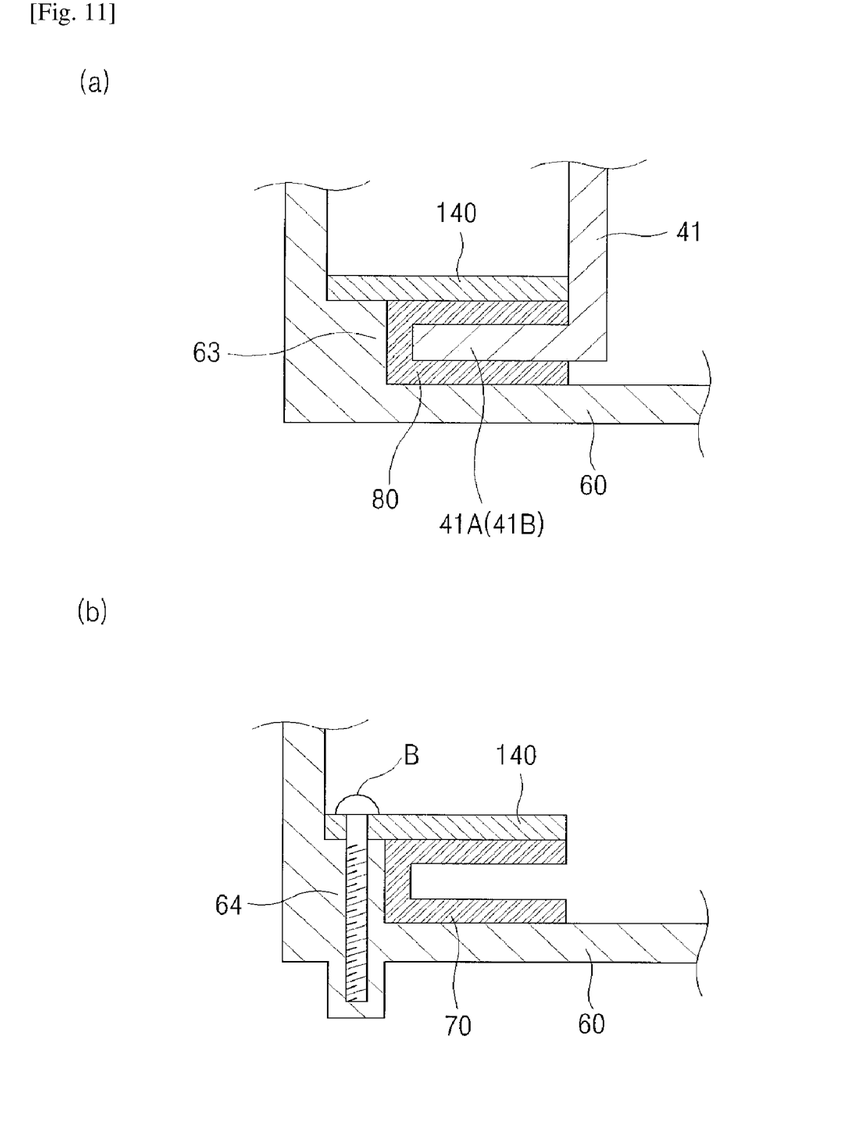
FIG. 11 are partial cross-sectional views by the fifth embodiment of the present invention.

Also, FIG. 7(c) illustrates the fourth embodiment of the present invention. The fixing bracket 41A is insertedly installed between the lower vibration absorbing projection 74 of the first damper for buffering 70 and the lower vibration absorbing projection 74, thereby installing the first damper for buffering 70 more stably.

Furthermore, FIGS. 8 to 11 illustrate the fifth embodiment of the present invention. Fitting concave inlet parts 41A" and 41B" are respectively formed at the outside of the fixing bracket 41A and fixing bracket 41B, and fitting concave inlet parts 70A" and 80A" are respectively formed at the outside of the main bodies 70A and 80A of the first damper for buffering 70 and the second damper for buffering 80, wherein the fitting concave inlet parts 41A" and 41B" respectively formed at the outside of the fixing bracket 41A and fixing bracket 41B and the fitting concave inlet parts 70A" and 80A" formed at the outside of the main bodies 70A and 80A are insertedly coupled to the first protruded fitting projection 63 which is protrudedly formed at the bottom surface of the lower housing 60.

In the above, in the state where the fitting concave inlet parts 41A" and 41B" of the fixing brackets 41A and 41B and the fitting concave inlet parts 70A" and 80a" of the main bodies 70A and 80A are inserted into the first protruded fitting projection 63, a ring for absorbing a buffering 140 covers top surfaces of the first protruded fitting projection 63 and the second protruded fitting projection 64 and top surfaces of the main bodies 70A and 80A of each of the first damper for buffering 70 and second damper for buffering 80, and fastens the top surfaces with the fastening bolt B through a fastening hole 64' formed in the second protruded fitting projection 64 and a fastening hole 140' formed in the ring for absorbing the buffering 140, thereby absorbing and reducing the vibration generated twice by the ring for absorbing the buffering 140, the first damper for buffering 70 and the second damper for buffering 80.

Figure 12:
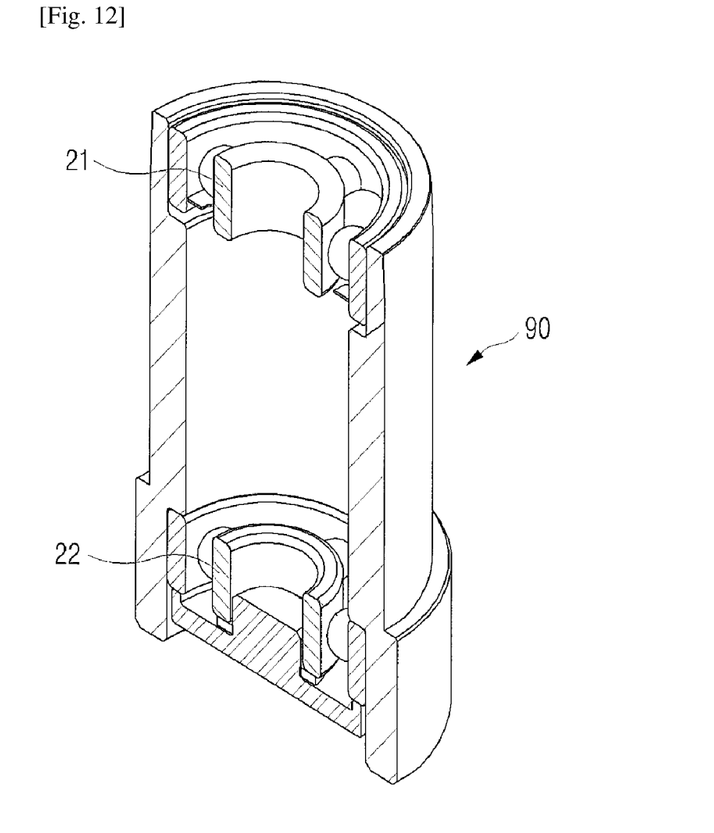
FIG. 12 is a perspective view cutting away a part of the bearing housing of the present invention.
Figure 13:
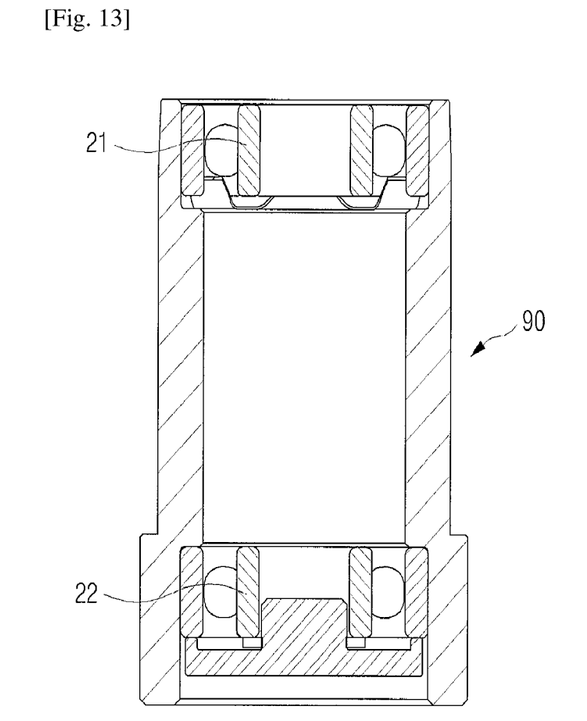
FIG. 13 is a cross-sectional view illustrating a bearing housing of the present invention.

Meanwhile, FIGS. 12 and 13 are a cut-away perspective view and a longitudinal cross-sectional view illustrating the bearing housing 90 of the present invention. Since the bearing housing 90 is integrally formed and provided, it is easy to install the upper and lower bearings 21 and 22 and the inner motor may be assembled rapidly.

Although the present invention is described as above with reference to embodiments, the embodiments are merely examples and do not limit the present invention. Also, it should be understood that various modifications and applications which are not exemplified in the above can be made by those skilled in the art within a scope not deviating from the essential properties of the present embodiments. In addition, it should be interpreted that differences associated with such modifications and applications fall within the scope of the present invention as prescribed by the appended claims.

The invention claimed is:

1. A blower motor (100), comprising:
   upper and lower bearings (21, 22) which are respectively installed on a top and a bottom of a rotating shaft (10);
   a rotor (30) which is installed around the rotating shaft (10);
   a stator (40) which gives a magnetic field to the rotor (30) to help the rotor (30) rotate;
   a fan (50) which is inserted into the top of the rotating shaft (10) to rotate;
   a lower housing (60) which supports the bottom of the rotating shaft (10);
   fixing brackets (41A, 41B) which prolong the bottom of an insulator (41) constituting the stator (40) to the outside;
   a first damper for buffering (70) which is insertedly installed on the fixing bracket (41A);
   a fitting projection for positioning (61) which is integrally protruded at a bottom surface of the lower housing (60) in which the fixing bracket (41B) is located;
   a second damper for buffering (80) which is insertedly and fixedly installed in the fitting projection (61); and
   an integral bearing housing (90) which stores the upper and lower bearings (21, 22).

2. The blower motor as defined in claim 1, wherein the fixing brackets (41A, 41B) are formed with fastening holes (41A', 41B'), respectively, one end of each of the first damper for buffering (70) and the second damper for buffering (80) coupled to the fixing brackets (41A, 41B) is formed with opening insertion parts (71, 81) into which the fixing brackets (41A, 41B) are inserted, and another end is formed with closed main bodies (70A, 80A); fastening holes (72, 82) formed at the center of the main bodies (70A, 80A); and left and right vibration absorbing grooves (73, 83) and top and bottom vibration absorbing projections (74, 84) respectively formed at both ends of the top and bottom of the main bodies (70A, 80A).

3. The blower motor as defined in claim 1, wherein hollow parts (70A', 80A') which have air filled inside the first damper for buffering (70) and second damper for buffering (80) are formed.

4. The blower motor as defined in claim 1, wherein a screw part (61') is formed at the top of the fitting projection (61), and a nut (61") is fastened to the screw part (61').

5. The blower motor as defined in claim 1, wherein the fixing bracket (41A) is insertedly installed between the lower vibration absorbing projection (74) of the first damper for buffering (70) and the lower vibration absorbing projection (74).

6. The blower motor as defined in claim 1, wherein fitting concave inlet parts (41A", 41B") are respectively formed at the outside of the fixing bracket (41A) and fixing bracket (41B), and fitting concave inlet parts (70A", 80A") are respectively formed at the outside of the main bodies (70A, 80A) of the first damper for buffering (70) and the second damper for buffering (80), wherein the fitting concave inlet parts (41A", 41B") respectively formed at the outside of the fixing bracket (41A) and fixing bracket (41B) and the fitting concave inlet parts (70A", 80A") formed at the outside of the main bodies (70A, 80A) are insertedly coupled to the first protruded fitting projection (63) which is protrudedly formed at the bottom surface of the lower housing (60).

7. The blower motor as defined in claim 6, wherein a ring for absorbing a buffering (140) covers top surfaces of the first protruded fitting projection (63) and the second protruded fitting projection (64) and top surfaces of the main bodies (70A, 80A) of each of the first damper for buffering (70) and the second damper for buffering (80), and fastens the top surfaces with a fastening bolt (B) through a fastening hole (64') formed in the second protruded fitting projection (64) and a fastening hole (140') formed in the ring for absorbing the buffering (140).

\* \* \* \* \*